(12) United States Patent
Copeman et al.

(10) Patent No.: US 7,216,040 B2
(45) Date of Patent: May 8, 2007

(54) INTELLIGENT NETWORK OF HYDROGEN SUPPLY MODULES

(75) Inventors: Tama Maya Copeman, Emmaus, PA (US); Christy John Sutton, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 11/104,177

(22) Filed: Apr. 11, 2005

(65) Prior Publication Data

US 2006/0229827 A1    Oct. 12, 2006

(51) Int. Cl.
*G01N 31/00* (2006.01)
*G06F 19/00* (2006.01)

(52) U.S. Cl. .............................. 702/24; 141/18; 141/98

(58) Field of Classification Search .................... 702/24
See application file for complete search history.

(56) References Cited

U.S. PATENT DOCUMENTS 6,745,105 B1    6/2004  Fairlie et al.
6,745,801 B1    6/2004  Cohen et al.
6,810,925 B2 *  11/2004 Graham et al. ................ 141/98

FOREIGN PATENT DOCUMENTS

WO    WO 01/28017 A2    4/2001

* cited by examiner

*Primary Examiner*—Michael Nghiem
*Assistant Examiner*—Sujoy Kundu
(74) *Attorney, Agent, or Firm*—Bryan C. Hoke, Jr.

(57) ABSTRACT

A method and apparatus for managing hydrogen deployment within a heterogeneous hydrogen supply environment is provided. An electronic controller monitors hydrogen supply modules, evaluates conditions relating to the hydrogen supply modules, and affects hydrogen deployment. The electronic controller may also monitor hydrogen utilizers within the heterogeneous hydrogen supply environment. Various means for adjusting hydrogen deployment are discussed.

15 Claims, 2 Drawing Sheets

INTELLIGENT NETWORK OF HYDROGEN SUPPLY MODULES

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

This invention relates to a method and apparatus for dispensing hydrogen within an environment with heterogeneous hydrogen requirements. The invention further relates to a network of hydrogen supply modules and corresponding method for managing hydrogen deployment.

The developing use of hydrogen as an energy carrier will require broad-based and flexible hydrogen supply systems to provide hydrogen efficiently to a large number of diverse hydrogen consumers.

Numerous hydrogen applications are being developed, including hydrogen-powered fuel cell or internal combustion vehicles, stationary power applications, backup power units, power grid management, power for remote locations, and portable power applications in consumer electronics, business machinery, and recreational equipment. Hydrogen dispensing stations will be needed for vehicle refueling, and smaller refill centers will be needed for portable devices such as computers, power tools, mobile communication devices, and other electronic equipment.

With the numerous hydrogen applications, warehouse distribution centers, airports, seaport docks, truck loading docks, offices, factories, shopping malls, sustainable towns and cities, and industrial environments will require a heterogeneous hydrogen supply environment. A wide range of power production devices, hydrogen storage technologies with different performance characteristics will be in use. In this complex environment, hydrogen will need to be supplied at different pressures, purities, and usage rates within the local environment. Hydrogen supply to several of these sites is further complicated because each of them has a unique usage pattern.

For example hydrogen fuel cells require a much higher purity hydrogen than internal combustion engines (ICEs) that run on hydrogen. Certain impurities, such as carbon monoxide in the hydrogen may poison a typical proton exchange membrane fuel cell but would have no negative impact on an ICE.

Hydrogen storage systems also have different hydrogen requirements. For example, metal hydrogen tanks store hydrogen typically at about 250 psia and have restrictions on impurities, for example less than 2 ppm carbon monoxide. Compressed gas storage tanks can store hydrogen up to about 10,000 psia and can accept higher levels of impurities.

Because the hydrogen volume requirements in these hydrogen applications will vary significantly and because the diverse hydrogen utilizers will be geographically dispersed, the logistics of hydrogen supply under normal conditions will be complex but manageable. Under abnormal conditions, however, hydrogen supply logistics may be especially complex and unpredictable. Abnormal conditions would occur, for example, when onsite hydrogen generators malfunction or are shut down for maintenance, or alternatively when local hydrogen demand temporarily exceeds local supply capability or storage capacity. There is a need to solve the problem of hydrogen management within the diverse heterogeneous hydrogen environment.

More specifically, there is a need for flexible and adaptable hydrogen supply methods to address these problems and supply hydrogen within a heterogeneous hydrogen environment and to address the interconnectivity of the various hydrogen utilizers within a heterogeneous hydrogen environment. Embodiments of the present invention, which are described below and defined by the claims that follow, address this need and offer flexible hydrogen supply alternatives for varied user requirements under both normal and abnormal demand conditions

BRIEF SUMMARY OF THE INVENTION

The present invention relates to a heterogeneous hydrogen supply network comprising hydrogen supply modules, an electronic controller, and a means for adjusting hydrogen deployment. Each of the hydrogen supply modules comprise a hydrogen source, a sensor for measuring a condition relating to the hydrogen source, and a dispensing connector in fluid communication with the hydrogen source. At least one of the dispensing connectors of one of the hydrogen supply modules is distinct from at least one of the dispensing connectors of another of the hydrogen supply modules. The electronic controller is in communication with the hydrogen supply modules and evaluates a set of conditions produced by the sensors. The means for adjusting hydrogen deployment is in communication with the electronic controller.

The hydrogen source may comprise a hydrogen storage vessel, a hydrogen generator, and/or a chemical hydride.

The means for adjusting hydrogen deployment may comprise a conveyance for moving a hydrogen supply module.

A hydrogen supply module may comprise an electricity generation means for converting hydrogen to electricity. A hydrogen supply module may comprise a battery and/or a capacitor. A hydrogen supply module may comprise a telemeter in communication with the electronic controller. A hydrogen supply modules may comprise a positioning system in communication with the electronic controller.

The heterogeneous hydrogen supply network may comprise a means for communicating information relating to a hydrogen delivery from an external hydrogen supply to the electronic controller.

The means for adjusting hydrogen deployment may comprise a conduit for controllably transferring hydrogen between hydrogen supply modules.

The heterogeneous hydrogen supply network may comprise hydrogen utilizers having various hydrogen requirements. Hydrogen utilizers may comprise a receiver for receiving instructions from the electronic controller as to where to acquire hydrogen. Hydrogen utilizers may comprise a telemeter and/or a positioning system. Hydrogen utilizers may comprise a sensor for measure a condition relating to hydrogen stored on the hydrogen utilizer. Hydrogen utilizers may comprise a battery and/or capacitor.

The means for adjusting hydrogen deployment may comprise a detachable fluid connection for transferring hydrogen between two hydrogen utilizers.

The present invention also relates to a method for distributing hydrogen within a heterogeneous hydrogen supply environment comprising dispensing hydrogen from hydrogen supply modules to hydrogen utilizers, subsequently measuring at least one condition relating to a hydrogen source at each of the hydrogen supply modules thereby forming a set of measured conditions, communicating the set of measured conditions to an electronic controller, evaluating the set of measured conditions via the electronic controller, and adjusting hydrogen deployment in response to the step of evaluating the set of measured conditions.

The step of adjusting hydrogen deployment may comprise moving a hydrogen supply module and subsequently dispensing hydrogen from the hydrogen supply module.

The step of dispensing hydrogen from hydrogen supply modules to hydrogen utilizers may comprise dispensing hydrogen to a hydrogen utilizer having a first hydrogen requirement at a first location and the step of adjusting hydrogen deployment may further comprise dispensing hydrogen to another hydrogen utilizer having a second hydrogen requirement at a second location.

The inventive method may further comprise transferring hydrogen from a hydrogen utilizer to a hydrogen supply module during the dispensing step and later dispensing at least a portion of that hydrogen at another location.

The step of adjusting hydrogen deployment may comprise directing a hydrogen utilizer to a hydrogen supply module and dispensing hydrogen from the hydrogen supply module to the hydrogen utilizer. The inventive method may comprise determining the position of the hydrogen utilizer and evaluating the position of the hydrogen utilizer via the electronic controller prior to directing the hydrogen utilizer to the hydrogen supply module. The inventive method may comprise determining the position of a hydrogen supply module and evaluating the position of the hydrogen supply module via the electronic controller prior to adjusting hydrogen deployment.

The step of adjusting hydrogen deployment may comprise transferring hydrogen from a hydrogen supply module to another hydrogen supply module.

The inventive method may comprise acquiring information relating to a hydrogen delivery to the heterogeneous supply environment from an external supply, communicating the information relating to the hydrogen delivery to the electronic controller, and evaluating the information via the electronic controller. The step of adjusting hydrogen deployment may then be additionally in response to this evaluation.

The inventive method may comprise determining the position of two hydrogen utilizers, measuring a condition relating to stored hydrogen in each of the two hydrogen utilizers, communicating the conditions to the electronic controller, and evaluating the conditions via the electronic controller. The step of adjusting hydrogen deployment may then comprise transferring hydrogen from one of the hydrogen utilizers to the other hydrogen utilizer.

The inventive method may comprise measuring a condition relating to stored hydrogen of a hydrogen utilizer and communicating the condition to the electronic controller. The step of adjusting hydrogen deployment may then comprise directing the hydrogen utilizer to a hydrogen supply module and transferring hydrogen from the hydrogen utilizer to the hydrogen supply module.

The inventive method may comprise measuring a condition relating to a hydrogen utilizer's stored hydrogen, measuring a condition relating to a hydrogen utilizer's stored electricity, and communicating these conditions to the electronic controller. Then the step of adjusting hydrogen deployment comprises instructing the hydrogen utilizer to preferentially consume either hydrogen or electricity.

The inventive method may comprise consuming hydrogen from a hydrogen supply module's hydrogen source to generate electricity and storing generated electricity in a battery and/or a capacitor.

DETAILED DESCRIPTION OF THE INVENTION

Compressed hydrogen gas is defined as hydrogen gas above its critical pressure, which is about 12.8 atmospheres.

Pressurized hydrogen gas is defined as hydrogen gas above atmospheric pressure but below hydrogen's critical pressure.

The invention with its embodiments will be described with reference to the figures.

Figure 1:
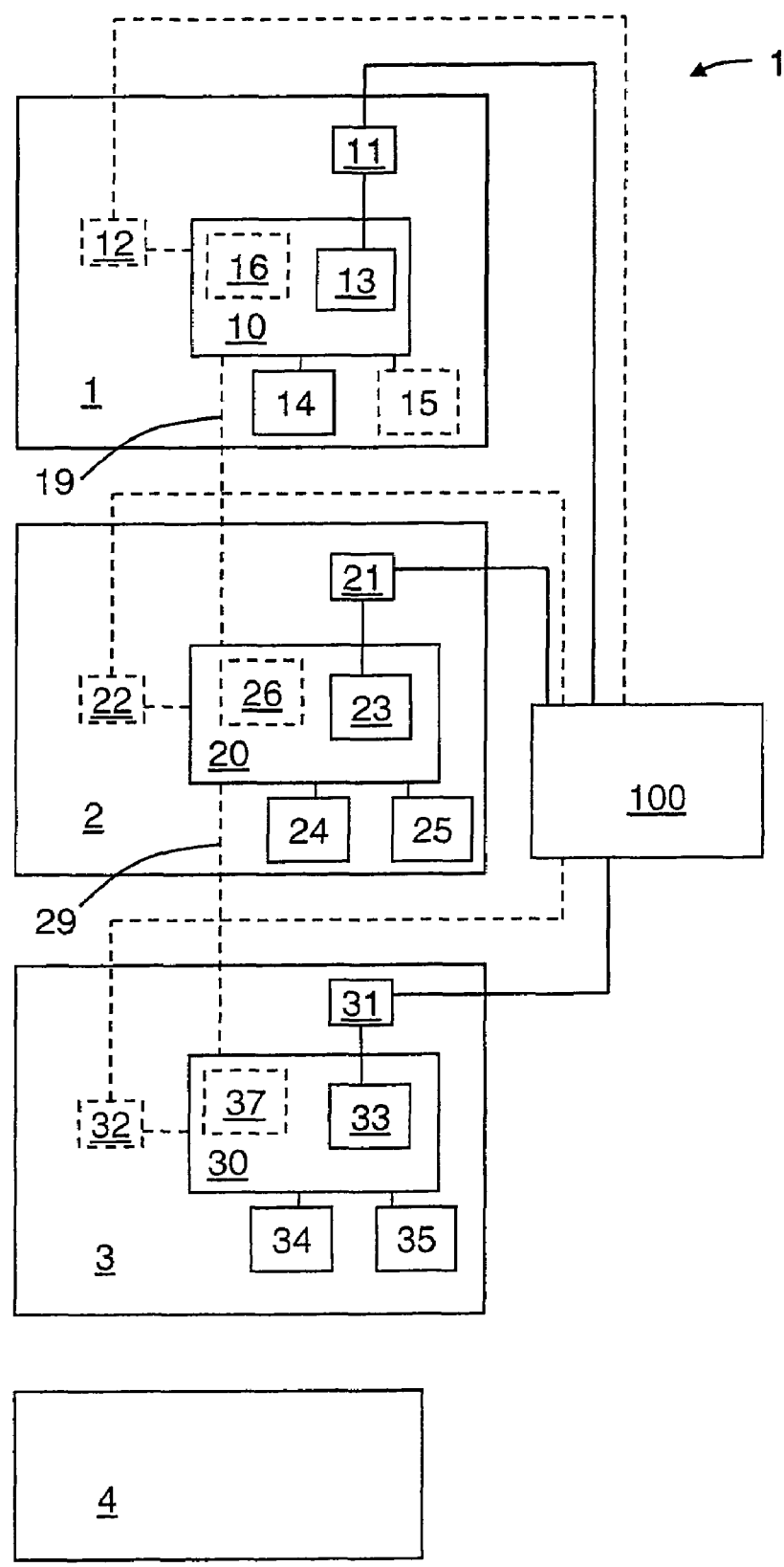
FIG. 1 is a schematic block diagram of one embodiment according to the invention showing hydrogen supply modules.

A schematic of a heterogeneous hydrogen supply network 1 is shown in FIG. 1 comprising a plurality of hydrogen supply modules 10, 20, and 30, an electronic controller 100, and means for adjusting hydrogen deployment. Various means for adjusting hydrogen deployment are discussed throughout this disclosure. Hydrogen deployment pertains to use, consumption, and dispensing of hydrogen.

Although illustrated with three hydrogen supply modules, the network may employ any number of hydrogen supply modules greater than one. Each of the hydrogen supply modules 10, 20, and 30 comprise a corresponding hydrogen source 13, 23, and 33, which may be a hydrogen storage vessel and/or a hydrogen generator. A hydrogen supply module may also comprise multiple hydrogen storage vessels and/or hydrogen generators. For example, a hydrogen supply module may comprise a high pressure hydrogen storage vessel, a low pressure hydrogen storage vessel, and an electrolyzer for generating hydrogen.

Each of the hydrogen supply modules 10, 20, and 30 also comprise a corresponding sensor 11, 21, and 31 for measuring a condition relating to the corresponding hydrogen source 13, 23, and 33. The sensors 11, 21, and 31 may be pressure sensors, densitometers, scales, temperatures sensors, purity sensors, or combinations thereof. The conditions measured by the sensors may be related to the amount of stored hydrogen, the density of the stored hydrogen, the purity of stored hydrogen, the pressure of stored hydrogen, the temperature of the stored hydrogen, the instant rate of hydrogen production of a hydrogen generator, or the maximum rate of hydrogen production of a hydrogen generator. In combination, the sensors of the hydrogen supply modules generate a set of measured conditions.

Telemeters may be integrated with the sensors 11, 21, and 31. A telemeter is any of various devices for measuring and transmitting data automatically from a source, i.e. the hydrogen supply modules 10, 20, and 30, to a receiving station i.e. the electronic controller 100.

The hydrogen supply modules 10, 20 and 30 also each comprise a dispensing connector in fluid communication with the hydrogen source for dispensing hydrogen. At least one of the hydrogen supply modules has a dispensing connector that is distinct from the dispensing connector of another of the hydrogen supply modules. Having distinct dispensing connectors means that one of the dispensing connectors dispenses one hydrogen requirement while the other dispensing connector dispenses another (different) hydrogen requirement. A hydrogen requirement is a specification relating to at least one of the state or phase (solid, liquid, gas, supercritical), pressure, temperature, and purity of the hydrogen. A first hydrogen supply module may have a first dispensing connector for dispensing a first hydrogen requirement while a second hydrogen supply module may have a second dispensing connector for dispensing a second hydrogen requirement that is different from the first hydrogen requirement. A hydrogen requirement could be, for example, liquid hydrogen. Another hydrogen requirement could be compressed hydrogen at greater than a specified pressure. Yet another hydrogen requirement could be hydrogen at a pressure between 1 and 2 atmospheres. Another hydrogen requirement could be hydrogen at a purity of 99.999% and less than 1 ppm CO. In a heterogeneous hydrogen environment, there will be hydrogen utilizers having different hydrogen requirements than other hydrogen utilizers. In FIG. 1, hydrogen supply module 10 has dispensing connector 14 and optional dispensing connector 15, hydrogen supply module 20 has dispensing connectors 24 and 25, and hydrogen supply module 30 has dispensing connectors 34 and 35. For example, dispensing connector 14 may be a connector for dispensing liquid hydrogen and optional dispensing connector 15 may be a connector for dispensing pressurized hydrogen. Also, for example, dispensing connector 24 may be a connector for dispensing compressed hydrogen and dispensing connector 25 may be a dispensing connector for dispensing pressurized hydrogen.

The electronic controller 100 is in communication with hydrogen supply modules 10, 20 and 30. The set of measured conditions generated by the sensors 11, 21, and 31 may be communicated to the electronic controller 100 by wired or wireless means. The electronic controller 100 evaluates the set of measured conditions and makes decisions about how to adjust hydrogen deployment within the heterogeneous hydrogen supply network. Although a single electronic controller 100 is shown, the network may employ multiple electronic controllers. The hydrogen deployment is adjusted via various means.

In one embodiment of the invention, a means for adjusting hydrogen deployment comprises a conveyance (not shown) for moving a hydrogen supply module. The conveyance may be a forklift, a conveyor belt, a hand truck, a trailer, a wagon, a cart, a boat, a ship, a barge, a truck or any related device.

Hydrogen supply modules 10, 20, and 30 may comprise positioning systems 12, 22, and 32, respectively. The positioning system may be the ubiquitous Global Positioning System (GPS) or it may be simply a position identifier associated with a connection in positions 1, 2, 3, or 4. For example, the hydrogen supply module 10 may have a modem (not shown) that is connected to a wall jack in position 1 that provides a signal to the electronic controller 100 identifying the modules' location.

In another embodiment of the invention, a means for adjusting hydrogen deployment comprises a conduit connecting hydrogen supply modules. In FIG. 1, conduit 19 connects hydrogen supply modules 10 and 20, and conduit 29 connects hydrogen supply modules 20 and 30. Conduits 19 and 29 provide controllable fluid communication between the hydrogen storage vessels or may provide fluid communication between a hydrogen generator of one hydrogen supply module and the storage vessel of another hydrogen supply module. Actuated valves may be used to regulate the flow between hydrogen supply modules.

In another embodiment of the invention, a hydrogen source 13, 23, or 33, may be a hydrogen generator that converts electricity to hydrogen, an electrolyzer for example. In another embodiment of the invention, a hydrogen source 13, 23, or 33 may be a reformer. In another embodiment of the invention, a hydrogen source 13, 23 or 33 may comprise a chemical hydride.

In another embodiment of the invention, a hydrogen supply module may comprise an electricity generation means, represented in FIG. 1 by 16 for module 10, and 26 for module 20, for converting hydrogen to electricity. The electricity generation means may be a fuel cell or it may be a hydrogen powered internal combustion engine coupled to an electric generator. The electricity may be used at the hydrogen supply module to provide lighting or accomplish some other function. Electricity may be transferred, or it may be stored.

In another embodiment of the invention, a hydrogen supply module may comprise an electricity storage means, represented in FIG. 1 by 37 in module 30, such as a battery or a capacitor. It may be useful to convert hydrogen to electricity and store it in a battery or a capacitor for future use. The electricity may also be transferred to another hydrogen supply module.

Figure 2:
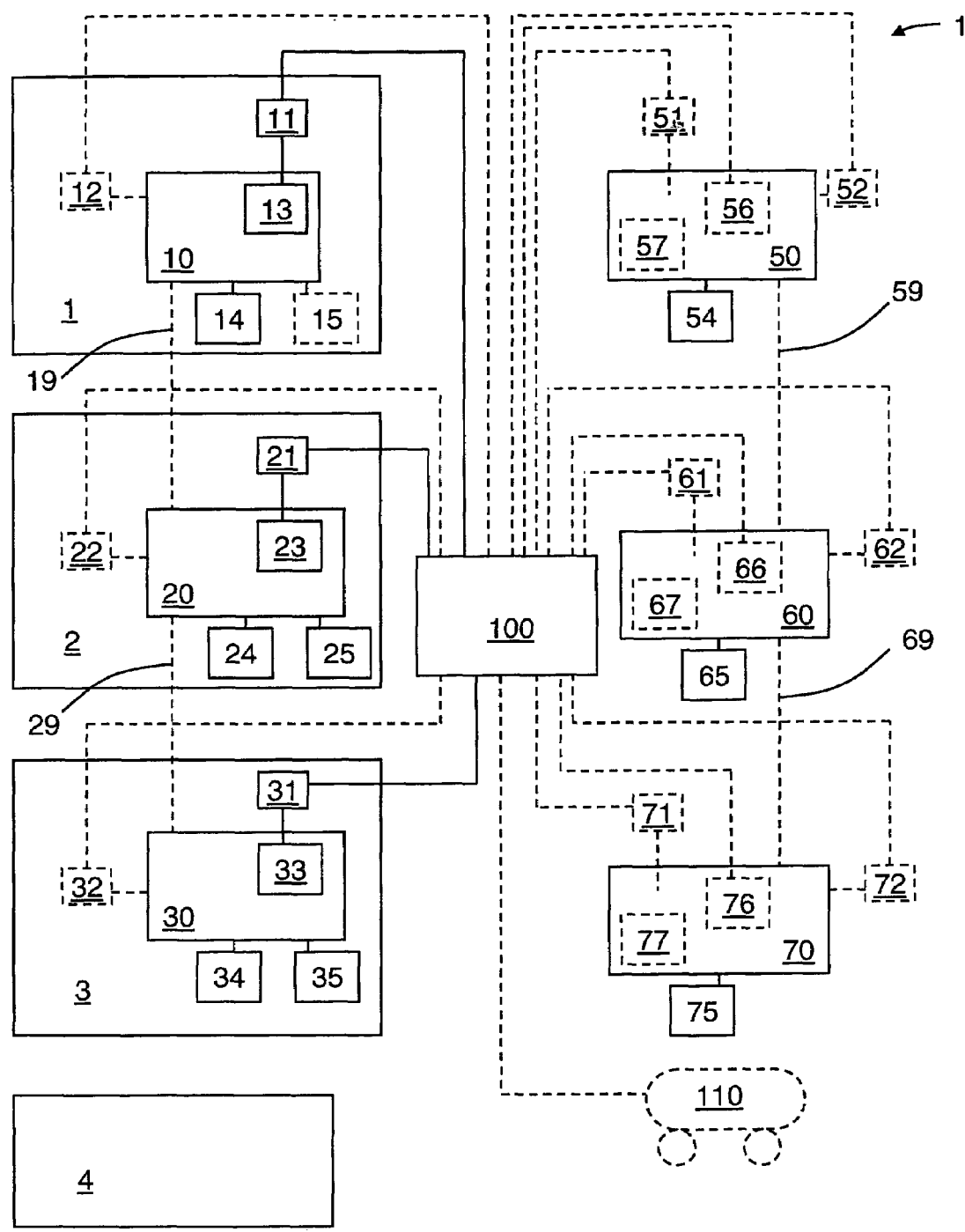
FIG. 2 is a schematic block diagram of an alternative embodiment according to the invention showing hydrogen supply modules and hydrogen utilizers.

The heterogeneous hydrogen supply network 1 may further comprise a plurality of hydrogen utilizers 50, 60, and 70 as illustrated in the embodiment in FIG. 2. A hydrogen utilizer is any device that uses hydrogen. A hydrogen utilizer may comprise a fuel cell to generate electric current or it may comprise a combustion engine. Hydrogen utilizer might include power tools, electronic devices, appliances, fuel cell vehicles (cars, buses, recreational vehicles, boats, forklifts, cranes, trucks, emergency vehicles, motorcycles, golf carts, scooters, and tractors), stationary power fuel cells, and backup of power generators. The elements described in FIG. 1 apply also to FIG. 2. Although illustrated with three hydrogen utilizers, the network may employ any number of hydrogen utilizers greater than one. At least one of the hydrogen utilizers has a different hydrogen requirement than at least one other hydrogen utilizer in the heterogeneous hydrogen supply network 1. For example, hydrogen utilizer 50 may require liquid hydrogen, while hydrogen utilizer 60 may require compressed hydrogen, while hydrogen utilizer 70 may require pressurized hydrogen.

Each of the hydrogen utilizers 50, 60, and 70 comprise a corresponding connector 54, 65, and 75 for receiving a dispensing connector. For example, connector 54 may be a liquid hydrogen type connector for receiving dispensing connector 14. For example, connector 65 may be a compressed hydrogen type connector for receiving dispensing connector 24. And, for example, connector 75 may be a pressurized hydrogen type connector for receiving either pressurized hydrogen dispensing connector 15 or dispensing connector 25.

In an embodiment of the invention, a means for adjusting hydrogen deployment comprises a receiver on board a hydrogen utilizer for receiving instruction from the electronic controller 100. Receiver 56 is shown on board hydrogen utilizer 50, receiver 66 is shown on board hydrogen utilizer 60 and receiver 76 is shown on board hydrogen utilizer 70. The receiver may comprise a display indicating which position to go to for acquiring hydrogen. The controller may automatically inform the hydrogen utilizer about a preferred location for getting hydrogen or the operator of the hydrogen utilizer may inquire to the electronic controller and receive direction regarding which location to get hydrogen.

Hydrogen utilizers 50, 60, and 70 may comprise positioning systems 52, 62, and 72, respectively. The positioning system may be the ubiquitous Global Positioning System (GPS) or it may be simply a position identifier associated with a hard wire connection within the heterogeneous hydrogen supply network 1. The electronic controller 100 may evaluate the location of the hydrogen utilizer before directing the hydrogen utilizer to a particular hydrogen supply module or location.

Each of the hydrogen utilizers 50, 60, and 70 may also comprise a corresponding sensor 51, 61, and 71 for measuring a condition relating to the corresponding hydrogen stored in the hydrogen utilizer. The sensors 51, 61, and 71 may be pressure sensors, densitometers, scales, temperatures sensors, purity sensors, or combinations thereof. The conditions measured by the sensors may be related to one or more of the amount of stored hydrogen, the purity of stored hydrogen, the pressure of stored hydrogen, or the temperature of the stored hydrogen. Telemeters may be integrated with the sensors 51, 61, and 71.

In another embodiment of the invention, a means for adjusting hydrogen deployment comprises a detachable fluid connection between hydrogen utilizers for transferring hydrogen between hydrogen utilizers. In FIG. 2, the detachable fluid connection is represented by conduit 59 between hydrogen utilizer 50 and utilizer 60 and by conduit 69 between hydrogen utilizer 60 and hydrogen utilizer 70. Conduits 59 and 69 provide controllable fluid communication between the hydrogen storage vessels. An analogy for the fluid connection between hydrogen utilizers might be a cigarette lighter adapter in a car for transferring power to a mobile phone battery.

The hydrogen utilizers may also comprise a detachable electrical connection to transfer electricity between the hydrogen utilizers.

In another embodiment of the invention, hydrogen utilizers 50, 60, and 70 may comprise electricity storage means, represented by 57, 67, and 77, respectively. The electricity storage means may be one or more batteries or capacitors.

In another embodiment of the invention, the heterogeneous supply network 1 comprises a means for communicating information related to a hydrogen delivery from an external hydrogen supply 110 to the electronic controller 100. Hydrogen may be delivered from an off-site supplier by a tanker truck or by boat in the case the heterogeneous supply network 1 is located at the docks of a seaport. The information relating to the hydrogen delivery from an external supply may be the delivery time, a delay of the scheduled delivery time, the price of the hydrogen delivery, the quantity of hydrogen to be delivered or the specification of the hydrogen to be delivered. The means for communicating hydrogen delivery information may be as simple as a phone call from the hydrogen supplier, where the information is manually input to the electronic controller 100. The means for communicating hydrogen delivery information may be automatic comprising a GPS on the delivery vehicle may take into account instant traffic conditions to estimate the time of arrival of the delivery vehicle.

The method according to the current invention comprises dispensing hydrogen from a plurality of hydrogen supply modules to a plurality of hydrogen utilizers, subsequently measuring a condition relating to a hydrogen source at each of the hydrogen supply modules, communicating the measured conditions to an electronic controller, evaluating the measured conditions via the electronic controller, and adjusting hydrogen deployment. According to the invention, a first hydrogen utilizer within the set of the plurality of hydrogen utilizers has a first hydrogen requirement and a second hydrogen utilizer within the set of the plurality of hydrogen utilizers has a second hydrogen requirement which is different from the first hydrogen requirement. For example, with reference to FIG. 2, the current invention encompasses dispensing hydrogen from a plurality of hydrogen supply modules 10, 20, and 30 to a plurality of hydrogen utilizers 50, 60, and 70, subsequently measuring a condition relating to a hydrogen source 13, 23, and 33 with sensors 11, 21, and 31, respectively at each of the hydrogen supply modules 10, 20, and 30, communicating the measured conditions to an electronic controller 100, evaluating the measured conditions via the electronic controller 100, and adjusting hydrogen deployment within the heterogeneous hydrogen supply environment.

12. The hydrogen source may be a hydrogen storage vessel. The hydrogen may be stored as a liquid in a cryogenic storage vessel. The hydrogen may be compressed hydrogen stored in one or more high pressure cylinders. The hydrogen may be pressurized hydrogen gas stored in a suitable storage vessel. The measured condition relating to the hydrogen storage vessel may be the pressure, the density, the inventory, the mass, the temperature, and/or the purity of the stored hydrogen.

The hydrogen source may be a hydrogen generator. Hydrogen may be produced by electrolysis, reforming of natural gas or other hydrocarbon fuel, or other means known in the art. The measured condition relating to the hydrogen generator may be the instant rate of hydrogen production, the maximum rate of hydrogen production, the instant price of electricity, or the instant price of natural gas. The natural gas may be from a local pipeline or derived from liquefied natural gas (LNG). The electronic controller may evaluate the cost effectiveness of producing hydrogen using an optimization algorithm. For example, the cost of electricity may go down at night due to reduced demand. During that time, it may be cost effective to generate hydrogen and store it for dispensing the next day.

The hydrogen produced by the hydrogen generator may be dispensed to a hydrogen utilizer as it is being produced. Or, the produced hydrogen may be transferred to a storage vessel associated with the hydrogen supply module thereby becoming stored hydrogen.

The hydrogen source may be a chemical hydride. The condition relating to the chemical hydride may be the percent of unspent chemical hydride, the mass of chemical hydride, or temperature.

By measuring the conditions relating to various hydrogen sources, stored and generated hydrogen, the electronic controller may manage and optimize the energy purchase and utilization for the heterogeneous hydrogen supply environment.

In an embodiment of the inventive method, the step of adjusting hydrogen deployment comprises moving a hydrogen supply module and subsequently dispensing hydrogen from the hydrogen supply module. For example, hydrogen supply module 10 may dispense liquid hydrogen while in position 1. Hydrogen supply module 10 may then be moved, for example, to position 4 to dispense more liquid hydrogen. Hydrogen supply module 10 may be moved by any conveyance.

The step of dispensing hydrogen from a plurality of hydrogen supply modules to a plurality of hydrogen utilizers may comprise dispensing a first hydrogen requirement from a hydrogen supply module at a first location and the step of adjusting hydrogen deployment may comprise dispensing a second hydrogen requirement from the same hydrogen supply module at a second location. For example, hydrogen supply module 10 may dispense liquid hydrogen while in position 1. While in position 1, some liquid hydrogen may evaporate to form pressurized hydrogen which is stored in another vessel associated with hydrogen supply module 10. After most or all of the liquid hydrogen has been dispensed from hydrogen supply module 10, it may be moved, for example, to position 4 to dispense the pressurized hydrogen it has accumulated during its time in position 1. Hydrogen supply module 10 may be moved to yet another location for refilling with hydrogen. Hydrogen supply module 10 may be moved by any conveyance.

In another example, hydrogen supply module 20 may dispense compressed hydrogen while in position 2. The pressure of the stored hydrogen may decrease, leaving pressurized hydrogen. Hydrogen supply module 20 may then be moved, for example, to position 4 to dispense pressurized hydrogen.

Hydrogen may be transferred from a hydrogen utilizer to a hydrogen supply module during the dispensing step. For example, during dispensing to a hydrogen utilizer with a liquid hydrogen requirement, gaseous hydrogen may be displaced from the storage vessel on the hydrogen utilizer and transferred back to the hydrogen supply module. This gaseous hydrogen collected by the hydrogen supply module may be later dispensed to another hydrogen utilizer that has a pressurized hydrogen requirement. This gaseous hydrogen could be dispensed at the same or a different location. For example, with reference to FIG. 2, hydrogen supply module 10 may dispense liquid hydrogen to hydrogen utilizer 50. Gaseous hydrogen displaced from the head space in the liquid storage vessel of hydrogen utilizer 50 may be transferred back to hydrogen supply module 10 during the dispensing of liquid hydrogen. After the liquid hydrogen has been depleted from hydrogen supply module 10, hydrogen supply module 10 may dispense pressurized hydrogen to hydrogen utilizer 70, which in this example has a pressurized hydrogen requirement.

In another scenario of the current invention, a hydrogen utilizer may transfer a lower grade or degraded hydrogen back to a hydrogen supply module during the dispensing step. The degraded hydrogen may be gaseous hydrogen in the case of a hydrogen utilizer requiring liquid hydrogen as described above or it may be lower purity hydrogen. Lower purity hydrogen may be offloaded from a hydrogen utilizer and replenished with higher purity hydrogen. Some or all of the lower grade hydrogen may be dispensed to another hydrogen utilizer having a less restrictive purity requirement at the same or different location.

The step of adjusting hydrogen deployment may comprise directing a hydrogen utilizer to a specific hydrogen supply module and dispensing hydrogen from the hydrogen supply module to the hydrogen utilizer. For example, after measuring conditions relating to the hydrogen source at each of the hydrogen supply modules, the electronic controller could evaluate the set of measured conditions, and direct a hydrogen utilizer to a specific hydrogen supply module. For example, if positions 1 and 3 are generally positions for dispensing liquid hydrogen, and hydrogen utilizer 50 is in need of liquid hydrogen, electronic controller 100 would direct hydrogen utilizer 50 to position 1 or 3, consistent with any algorithm that may be in place.

The electronic controller may evaluate the position of the hydrogen utilizer prior to directing the hydrogen utilizer to a hydrogen supply module. The electronic controller may evaluate the position of a hydrogen supply module prior to directing the hydrogen utilizer to the hydrogen supply module or other step of adjusting hydrogen deployment. For example, the electronic controller may direct the hydrogen utilizer to the closest hydrogen supply module having the hydrogen requirement, or depending on the quantity available may direct the hydrogen utilizer to a more distant hydrogen supply module having the hydrogen requirement.

The step of adjusting hydrogen deployment may comprise transferring hydrogen from one hydrogen supply module to another hydrogen supply module. For example, with reference to FIG. 2, hydrogen may be transferred from hydrogen supply module 10 to hydrogen supply module 20 via conduit 19. It may be more convenient to transfer hydrogen between hydrogen supply modules than to direct a hydrogen utilizer to a different hydrogen supply module. The step of adjusting hydrogen deployment may comprise transferring hydrogen from one hydrogen supply model to another hydrogen supply module, for example, when module 10 has only dispensing connector 14 where dispensing connector 14 is for dispensing liquid hydrogen, module 20 has dispensing connector 25 where dispensing connector 25 is for dispensing pressurized hydrogen and a hydrogen utilizer requires pressurized hydrogen. The electronic controller may instruct for hydrogen to be transferred from module 10 to module 20 through conduit 19 whereupon, after any required treatment, pressurized hydrogen is dispensed via connector 25 to the hydrogen utilizer.

According to the invention, the method may comprise steps relating to an external supply of hydrogen. Information relating to a delivery may be acquired and communicated to the electronic controller. The electronic controller may evaluate the information and the step of adjusting hydrogen deployment may depend on the evaluation of this information. The information relating to the hydrogen delivery from an external supply may include a scheduled delivery time, a delay of a scheduled delivery time, the price of the hydrogen delivery, the quantity of the hydrogen delivery, and the specification of the hydrogen delivery. The specification of the hydrogen delivery may relate to the pressure, temperature, density, phase and/or purity of the delivered hydrogen.

According to the invention, the method may comprise determining the location of two hydrogen utilizers, measuring a condition relating to stored hydrogen on board the two hydrogen utilizers, communicating the conditions to the electronic controller, evaluating the conditions via the electronic controller, wherein the step of adjusting hydrogen deployment comprises transferring hydrogen from one of the hydrogen utilizers to the other hydrogen utilizer. The condition relating to stored hydrogen on board the hydrogen utilizers may be pressure, density, inventory, mass, temperature, rate of hydrogen usage, anticipated hydrogen usage, and/or concentration of the stored hydrogen. For example, utilizer 70 may be nearly depleted of pressurized hydrogen as indicated by a pressure sensor or densitometer. Utilizer 70 may communicate the condition and position to the electronic controller 100. Utilizer 60 may be nearby and communicate a condition relating to its stored hydrogen indicating sufficient stored hydrogen and its position to the electronic controller 100. Electronic controller 100 may evaluate the conditions and positions and determine that utilizer 60 may transfer hydrogen to utilizer 70. Hydrogen may then be transferred from utilizer 60 to utilizer 70 via conduit 69.

According to the invention, the method may comprise measuring a condition relating to the stored hydrogen on board a hydrogen utilizer, and communicating the condition to the electronic controller, wherein the step of adjusting hydrogen deployment comprises directing the hydrogen utilizer to a hydrogen supply module and transferring hydrogen from the hydrogen utilizer to the hydrogen supply module. Transferring hydrogen from a hydrogen utilizer to a hydrogen supply module may be desirable for a number of reasons. Hydrogen may need to be offloaded from a hydrogen utilizer prior to repair or maintenance. Hydrogen may be required for a more important utilizer. A hydrogen utilizer may not be needed for a long period of time. The hydrogen utilizer may not meet transportation regulations and need to be transported to other locations without any contained hydrogen. It may just be prudent to transport a hydrogen utilizer empty, for example through a public area between utilizer locations.

Hydrogen utilizers may have both hydrogen storage and electricity storage. Accordingly, the controller may decide which form of energy for the hydrogen utilizer to use. The method may comprise measuring a condition relating to the stored hydrogen on board a hydrogen utilizer, measuring a condition relating to the stored electricity on board the hydrogen utilizer, and communicating the conditions to the electronic controller, wherein the step of adjusting hydrogen deployment comprises instructing the hydrogen utilizer to consume the stored electricity. Alternatively, the electronic controller may instruct the hydrogen utilizer to consume the stored hydrogen and conserve the stored electricity.

At some point it may be desirable to consume hydrogen to generate electricity and store the electricity. Accordingly the method of the current invention may comprise steps of consuming hydrogen in a hydrogen supply module to generate electricity and storing the generated electricity in a battery and/or a capacitor.

Conversely, it may be desirable to consume electricity to generate hydrogen. Accordingly the method of the current invention may comprise steps of consuming electricity to generate produced hydrogen and storing the produced hydrogen at the hydrogen supply module. The hydrogen may be produced by electrolysis of water.

Although illustrated and described herein with reference to specific embodiments, the present invention nevertheless is not intended to be limited to the details shown. Rather, various modifications may be made in the details within the scope and range of equivalents of the claims without departing from the spirit of the invention.

We claim:

1. A heterogeneous hydrogen supply network comprising:
a plurality of hydrogen supply modules, each of the plurality of hydrogen supply modules comprising (a) a hydrogen source, (b) a sensor for measuring at least one condition relating to the hydrogen source and (c) a dispensing connector in fluid communication with the hydrogen source for dispensing hydrogen wherein the dispensing connector of a first of said plurality of hydrogen supply modules dispenses a first hydrogen requirement and the dispensing connector of a second of said plurality of hydrogen supply modules dispenses a second hydrogen requirement which is different from the first hydrogen requirement;
an electronic controller in communication with the plurality of hydrogen supply modules for evaluating a set of measured conditions produced by the sensors; and
a means for adjusting hydrogen deployment in communication with the electronic controller for adjusting hydrogen deployment in response to evaluating the set of measured conditions.

2. The heterogeneous hydrogen supply network of claim 1 wherein the means for adjusting hydrogen deployment comprises a conveyance for moving at least one of the plurality of hydrogen supply modules.

3. The heterogeneous hydrogen supply network of claim 1 wherein at least one of the plurality of hydrogen supply modules further comprises at least one of a telemeter in communication with the electronic controller and a positioning system in communication with the electronic controller.

4. The heterogeneous hydrogen supply network of claim 1 further comprising a means for communicating information relating to a hydrogen delivery from an external hydrogen supply to the electronic controller.

5. The heterogeneous hydrogen supply network of claim 1 wherein the means for adjusting hydrogen deployment comprises a conduit for providing controllable fluid communication between the hydrogen sources of at least two of the plurality of hydrogen supply modules.

6. The heterogeneous hydrogen supply network of claim 1 further comprising a plurality of hydrogen utilizers, wherein a first of said plurality of hydrogen utilizers has a first hydrogen requirement and wherein a second of said plurality of hydrogen utilizers has a second hydrogen requirement different from the first hydrogen requirement, and wherein the first of said plurality of hydrogen utilizers has a first connector for receiving the dispensing connector of the first of said plurality of hydrogen supply modules and the second of said plurality of hydrogen utilizers has a second connector for receiving the dispensing connector of the second of said plurality of hydrogen supply modules.

7. The heterogeneous hydrogen supply network of claim 6 wherein the means for adjusting hydrogen deployment comprises a receiver on board at least one of the plurality of hydrogen utilizers for receiving instructions from said electronic controller directing the at least one of the plurality of hydrogen utilizers to at least one of the plurality of hydrogen supply modules.

8. The heterogeneous hydrogen supply network of claim 6 wherein at least one of the plurality of hydrogen utilizers comprises at least one of a telemeter for communicating with the electronic controller and a positioning system.

9. The heterogeneous hydrogen supply network of claim 6 wherein at least one of the plurality of hydrogen utilizers comprises a sensor for measuring at least one condition relating to the stored hydrogen in the at least one of the plurality of hydrogen utilizers.

10. The heterogeneous hydrogen supply network of claim 6 wherein the means for adjusting hydrogen deployment comprises a detachable fluid connection for transferring hydrogen from at least one of the plurality of hydrogen utilizers to another of the plurality of hydrogen utilizers.

11. The heterogeneous hydrogen supply network of claim 6 wherein at least one of the plurality of hydrogen utilizers comprises at least one of a battery and a capacitor.

12. The heterogeneous hydrogen supply network of claim 1 wherein the hydrogen source comprises at least one of a hydrogen storage vessel, a hydrogen generator, and a chemical hydride.

13. The heterogeneous hydrogen supply network of claim 1 wherein at least one of the plurality of hydrogen supply modules further comprises an electricity generation means for converting hydrogen to electricity.

14. The heterogeneous hydrogen supply network of claim 1 wherein at least one of the plurality of hydrogen supply modules further comprises at least one of a battery and a capacitor.

15. A heterogeneous hydrogen supply network comprising:
a plurality of hydrogen supply modules, each of the plurality of hydrogen supply modules comprising (a) at least one of a hydrogen storage vessel and a hydrogen generator, (b) a sensor for measuring at least one condition relating to the at least one of the hydrogen storage vessel and the hydrogen generator and (c) a dispensing connector in fluid communication with at least one of the hydrogen storage vessel and the hydrogen generator for dispensing hydrogen wherein the dispensing connector of a first of said plurality of hydrogen supply modules dispenses a first hydrogen requirement and the dispensing connector of a second of said plurality of hydrogen supply modules dispenses a second hydrogen requirement which is different from the first hydrogen requirement;

an electronic controller in communication with the plurality of hydrogen supply modules for evaluating a set of measured conditions produced by the sensors; and a means for adjusting hydrogen deployment in communication with the electronic controller for adjusting hydrogen deployment in response to evaluating the set of measured conditions.

* * * * *